United States Patent Office 3,202,699
Patented Aug. 24, 1965

3,202,699
CARBOBENZOXYGLYCYLAMINO-
BENZOPHENONES
Arthur Stempel, Teaneck, N.J., assignor to Hoffmann-
La Roche Inc., Nutley, N.J., a corporation of New
Jersey
No Drawing. Filed July 11, 1961, Ser. No. 123,964
5 Claims. (Cl. 260—471)

This invention relates to a novel process for the preparation of 2-glycylaminobenzophenones and novel intermediates therefor. 2 - glycylaminobenzophenones have been found to be valuable therapeutic agents having utility as anticonvulsants, muscle relaxants, sedatives and tranquilizers. They can be administered internally, for example orally and parenterally, and can be administered in any conventional pharmaceutical form, for example as solutions, suspensions, capsules, tablets, suppositories and the like. 2-glycylaminobenzophenones also possess utility as chemical intermediates in the production of 5-phenyl-3H-1,4-benzodiazepin-2(1H)-ones, which in turn have utility as medicinal agents as anticonvulsants, muscle relaxants and sedatives and, further, also have utility as chemical intermediates.

The novel process of the invention comprises treating a 2-carbobenzoxyglycylaminobenzophenone with hydrohalic acid in the presence of acetic acid. 2-carbobenzoxyglycylaminobenzophenones are novel compounds and constitute a part of the invention. Also the process for their preparation is comprehended by the scope of the invention. Thus, the overall process of the invention comprises reacting a 2-aminobenzophenone with a carbobenzoxyglycylating agent, and treating the resultant 2-carbobenzoxyglycylaminobenzophenone with hydrohalic acid in the presence of acetic acid.

More particularly the process of the invention comprises the preparation of compounds of the formula (I) 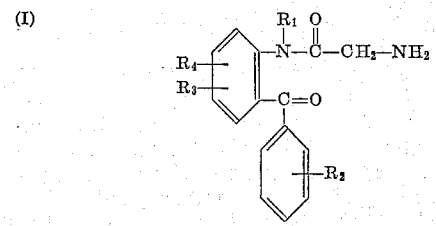

wherein $R_1$ is selected from the group consisting of hydrogen and lower alkyl; $R_2$, $R_3$, and $R_4$ are selected from the group consisting of hydrogen, lower alkyl, halogen, hydroxy, lower alkoxy, trifluoromethyl, nitro, amino, lower alkanoylamino, mercapto, lower alkylthio, lower alkylsulfinyl, lower alkylsulfonyl, cyano, carboxy and lower carbalkoxy, which comprises reacting a compound of the formula (II) 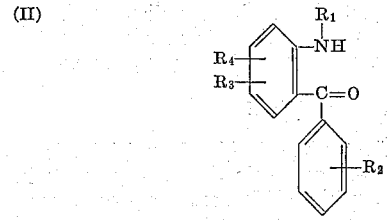

wherein $R_1$, $R_2$, $R_3$ and $R_4$ have the same meaning as above, with a carbobenzoxy glycylating agent, and treating the resultant compound of the formula (III) 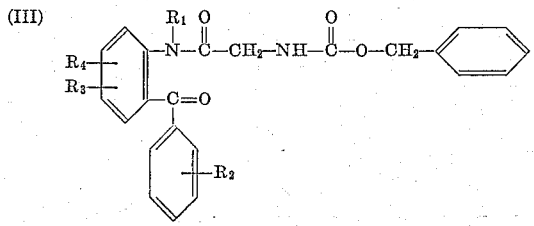

wherein $R_1$, $R_2$, $R_3$ and $R_4$ have the same meaning as above, with hydrohalic acid in the presence of acetic acid.

As can be seen from the above, one embodiment of the invention comprises a two-step process for the preparation of 2-glycylaminobenzophenones from 2-aminobenzophenones. Certain of the 2-aminobenzophenones are known compounds. Others, which do not form a part of the present invention, but whose preparation is disclosed herein for the sake of completeness, do not appear in the literature. The first step of the two-step process comprises the carbobenzoxyglycylation of a 2-aminobenzophenone. Useful as carbobenzoxyglycylating agents are compounds such as carbobenzoxy glycine, carbobenzoxy glycine anhydride and carbobenzoxy glycyl halide. The carbobenzoxyglycylation can be conducted at room temperature, or at temperatures above or below room temperatures.

In one preferred embodiment of the invention the carbobenzoxyglycylation is effected by condensing carbobenzoxy glycine with a 2-aminobenzophenone in the presence of an N,N'-disubstituted carbodiimide. The N,N'-disubstituted carbodiimides used as condensing agents can be obtained by diverse means. If suitably substituted carbodiimides, e.g., N,N'-dicyclohexyl-carbodiimide, are used urea derivatives are obtained as by-products which can be easily separated from the reaction product. The reaction can, for example, be carried out at a temperature between 0° C. and 50° C., preferably at room temperature or a temperature slightly below room temperature. Advantageously, a solvent is used for the reaction. Solvents which can be used for this purpose include organic solvents, e.g., methylene chloride, chloroform, dioxane, tetrahydrofuran, dimethylformamide, acetonitrile, and the like, as well as water. The 2-carbobenzoxyglycylaminobenzophenones (exemplified by Formula III above) are novel compounds and form a part of the present invention.

A further embodiment of the invention comprises obtaining a 2-glycylaminobenzophenone via treatment of a 2-carbobenzoxyglycylaminobenzophenone with a hydrohalic acid in the presence of acetic acid. This reaction results in the selective splitting of one of the amide linkages in the carbobenzoxyglycylamino chain so as to yield a glycylamino compound. An especially preferred embodiment of the invention is the use of hydrobromic acid as the hydrohalic acid in the process. However, other hydrohalic acids, such as hydrochloric acid can also be used. The reaction can be performed either in aqueous or anhydrous media. It can be conducted at room temperature or temperatures above or below room temperature.

A further embodiment of the invention is a process for the preparation of 5-phenyl-3H-1,4-benzodiazepin-2(1H)-ones which comprises the steps of treating a 2-carbobenzoxyglycylaminobenzophenone with hydrohalic acid in the presence of acetic acid and alkalizing the crude reaction product to a pH of at least about 7, i.e., to at least neutrality. Thus, 5-phenyl-3H-1,4 - benzodiazepin - 2(1H)-ones can be directly prepared from 2-carbobenzoxyglycylaminobenzophenones without isolating the intermediate 2-glycylaminobenzophenones. Thus, compounds of Formula III can be directly converted into compounds of the formula (IV)

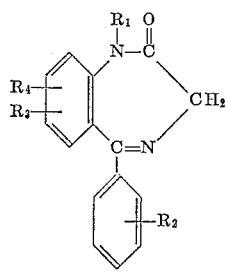

wherein $R_1$, $R_2$, $R_3$ and $R_4$ have the same meaning as above without isolation of the intermediate compound of Formula I. As the alkalizing agent either strong or weak bases can be used, for example ammonia, alkali metal hydroxides, such as sodium hydroxide, potassium hydroxide, alkaline earth metal hydroxides, such as calcium hydroxide, and the like.

As discussed above, the conversion of 2-aminobenzophenones to 2-glycylaminobenzophenones via carbobenzoxyglycylation, followed by treatment with hydrohalic acid in the presence of acetic acid, results in the conversion of 2-aminobenzophenones to 2-glycylaminobenzophenones efficiently and in good yield.

The following examples are illustrative, but not limitative of the invention. Other embodiments will be readily apparent to those skilled in the art. All temperatures are in degrees centigrade.

*Example 1*

To a solution of 2.3 g. of 2-amino-5-chlorobenzophenone and 2.1 g. of carbobenzoxyglycine in 25 cc. of tetrahydrofuran, 2.2 g. of N,N'-dicyclohexylcarbodiimide was added. After stirring for several minutes, dicyclohexylurea began to crystallize. Stirring was continued for 2 hours and dicyclohexylurea was then filtered off. The filtrate was then treated with 2 cc. of acetic acid to decompose any excess N,N' - dicyclohexylcarbodiimide. After 15 minutes additional solid was removed by filtration. The filtrate was taken to dryness in vacuo and the residue was dissolved in benzene and washed successively with 1 N hydrochloric acid, water, and 5% sodium bicarbonate, and then dried over sodium sulfate. The benzene layer was concentrated to ca. 30 cc. and hexane added to turbidity. On seeding (2-benzoyl-4-chlorophenylcarbamoylmethyl) carbamic acid benzyl ester crystallized which upon recrystallization from ethanol, melted at 116–117°.

*Example 2*

A solution of 1.1 g. of 2-amino-5-chlorobenzophenone and 2.0 g. of carbobenzoxyglycine anhydride in 25 cc. of dry pyridine was stirred for 2 hours at room temperature, kept overnight at room temperature and then heated for 1 hour on a steam bath. The solvent was removed by distillation in vacuo and the residue then dissolved in 75 cc. of benzene, washed with dilute hydrochloric acid, water, and dilute sodium bicarbonate. After drying over sodium sulfate, the solvent was removed in vacuo and the residue crystallized from ethanol to give (2-benzoyl-4-chlorophenylcarbamoylmethyl) carbamic acid benzyl ester.

*Example 3*

To a solution of 7.1 g. of crude carbobenzoxyglycine chloride in 150 cc. of dry pyridine, 7.0 g. of 2-amino-5-chlorobenzophenone was added. After warming for 1 hour on a steam bath, the solvent was distilled off in vacuo. The residue was dissolved in methylene chloride and washed successively with dilute hydrochloric acid, water, and dilute sodium carbonate. After drying over sodium sulfate, the solvent was removed in vacuo and the residue crystallized from ethanol to give (2-benzoyl-4-chlorophenylcarbamoylmethyl) carbamic acid benzyl ester.

*Example 4*

A solution of 3.1 g. of (2-benzoyl-4-chlorophenylcarbamoylmethyl) carbamic acid benzyl ester in 30 cc. of 20% hydrogen bromide in acetic acid was stirred for 35 minutes at room temperature. Then 175 cc. of anhydrous ether was added rapidly while stirring. The gummy material that separated was stirred for 10 minutes, the supernatant liquid decanted and the residue again stirred for 10 minutes with 125 cc. of ether. The ether was decanted and the residue then dissolved in 100 cc. of water to produce a turbid solution. This solution was extracted twice with ether and the washings discarded. On addition of ammonia to the aqueous solution to pH 11, a white crystalline product separated. This was extracted with methylene chloride and, after drying over sodium sulfate, the methylene chloride was evaporated in vacuo at 20° leaving a residue which upon crystallization from benzene-hexane yielded 5-chloro - 2 - glycylaminobenzophenone melting at 101–103°.

*Example 5*

A solution of 5.0 g. of 2-amino-2',5-dichlorobenzophenone and 3.9 g. of carbobenzoxyglycine in 125 cc. of methylene chloride was cooled to 0° and 3.9 g. of N,N'-dicyclohexylcarbodiimide was added in four portions at 30 minute intervals. The reaction was kept cool for 6 hours and then kept at room temperature overnight. About 4 cc. of acetic acid was added to decompose excess N,N'-dicyclohexylcarbodiimide. After stirring for 30 minutes, dicyclohexylurea was removed by filtration and the filtrate was then washed with dilute sodium bicarbonate, dried over sodium sulfate and concentrated to dryness in vacuo. Recrystallization from a mixture of benzene and hexane gave crude crystalline 2-(2-chlorobenzoyl-4-chlorophenylcarbamoylmethyl) carbamic acid benzyl ester which upon recrystallization from benzene-hexane formed colorless needles melting at 148–148.5°.

The 2-amino-5,2'-dichlorobenzophenone used above as a starting material is not a part of this invention but its preparation is hereinbelow set forth in order that the present disclosure may be complete.

o-Chlorobenzoylchloride (600 g.) was heated to 110° in a 5 l. three-necked flask equipped with thermometer, mechanical stirrer, and reflux condenser. To this p-chloroaniline (175 g.) was added under stirring. The mixture was then heated to 180° and zinc chloride (230 g.) was added. The temperature now was gradually raised to 220–230° and kept there until the HCl evolution had ceased (1–2 hours). After cooling to 120°, water was cautiously added and the mixture heated to reflux. The hot water layer was decanted and this procedure repeated 2 or 3 times.

The water insoluble brown mass was finally suspended in a mixture of 350 ml. water, 500 ml. acetic acid and 650 ml. conc. sulfuric acid and heated to reflux for 17 hours. After cooling, the homogeneous dark solution was poured into ice water, the mixture extracted with ether, the ether extract was neutralized with 2 N NaOH. Conc. of the ether solution and addition of a small amount of petroleum ether yielded 2-amino-2',5-dichloro-benzophenone in yellow crystals, which after recrystallization from ether-petroleum ether yielded the pure compound, M.P. 88–89°.

*Example 6*

A solution of 2.5 g. of 2-(2-chlorobenzoyl-4-chlorophenylcarbamoylmethyl) carbamic acid benzyl ester in 30 cc. of 20% hydrobromic acid in acetic acid was stirred for 30 minutes at room temperature. On slow addition of 175 cc. of anhydrous ether, a gummy precipitate formed. The supernatant liquid was poured off and the residue was stirred with water and ether. Dilute ammonia was added until slightly alkaline. The ether layer was then separated, dried over sodium sulfate and after the addition of some benzene, concentrated in vacuo to a small volume. On addition of hexane to the residue, 2',5-dichloro-2-glycinaminobenzophenone crystallized; M.P. 121–122°.

Example 7

A solution of 3.8 g. of 2-aminobenzophenone and 4.0 g. of carbobenzoxyglycine in 150 cc. of methylene chloride was cooled to 0° and 4.0 g. of N,N'-dicyclohexylcarbodiimide was added in four portions at 30 minute intervals. After stirring for 6 hours in an ice bath, the reaction mixture was kept overnight at room temperature, then stirred for 20 minutes after the addition of 4 cc. of acetic acid. Dicyclohexylurea was filtered off and the filtrate washed with dilute sodium bicarbonate. Following drying over sodium sulfate, solvent was distilled off in vacuo. The residue was crystallized from a mixture of benzene and hexane to give (2-benzoylphenylcarbamoylmethyl)carbamic acid benzyl ester which upon being twice crystallized from benzene-hexane melted at 116–117°.

Example 8

A solution of 4.5 g. of (2-benzoylphenylcarbamoylmethyl) carbamic acid benzyl ester in 45 cc. of 20% hydrobromic acid in acetic acid was stirred for 30 minutes at room temperature. Anhydrous ether (175 cc.) was then added. After pouring off the supernatant, the residue was stirred with water and ether, cooled in an ice bath, and made slightly alkaline with ammonia. The ether layer was dried over sodium sulfate, filtered, some benzene added and the resulting solution concentrated in vacuo to a small volume. On addition of hexane to the residue, 2-glycylaminobenzophenone crystallized and upon recrystallization from benzene and hexane, melted at 76–77°.

Example 9

To a solution of 5.0 g. of 2-amino-2'-nitrobenzophenone and 4.3 g. of carbobenzoxyglycine in 250 cc. of methylene chloride cooled to 0°, 4.3 g. of N,N'-dicyclohexylcarbodiimide was added in four portions at 30 minute intervals. After stirring 6 hours in an ice bath, the reaction was kept at room temperature for 2 days. Following the addition of 4 cc. of acetic acid, the reaction was stirred for 20 minutes and dicyclohexylurea was filtered off. The filtrate was washed with dilute hydrochloric acid, water, and dilute sodium bicarbonate. After drying over sodium sulfate, solvent was distilled off in vacuo. The residue was dissolved in ether and passed through a column of 150 g. of Woelm alumina neutral grade I. Elution with ether gave recovered 2-amino-2'-nitrobenzophenone. Further elution with a mixture of ether and ethyl acetate (3:1) gave crude [2-(2-nitrobenzoyl)phenylcarbamoylmethyl] carbamic acid benzyl ester which upon two crystallizations from a mixture of benzene and hexane melted at 131–132°.

Example 10

A solution of 3.1 g. of [2-(2-nitrobenzoyl)phenyl-carbamoylmethyl] carbamic acid benzyl ester in 30 cc. of 20% hydrobromic acid in acetic acid was stirred for 30 minutes at room temperature. On addition of 150 cc. of anhydrous ether, crude 2-glycylamino-2'-nitrobenzophenone hydrobromide crystallized and upon recrystallization from a mixture of methanol and ether formed filament like colorless needles melting at 201–203°.

A solution of the hydrobromide in water was made slightly alkaline with ammonia. The free base, 2-glycylamino-2'-nitrobenzophenone crystallized. Recrystallization from a mixture of benzene and hexane gave colorless prisms melting at 160–162°.

Example 11

A solution of 10.0 g. of 5-trifluoromethyl-2-aminobenzophenone and 7.8 g. of carbobenzoxyglycine in 300 cc. of methylene chloride was stirred and cooled to 0° in an ice bath. N,N'-dicyclohexylcarbodiimide (7.8 g.) was then added in four portions at 30 minute intervals. Stirring was continued for 6 hours in an ice bath and the reaction was then kept overnight at room temperature. The next day, 8 cc. of acetic acid was added and after stirring for 30 minutes, dicyclohexylurea was filtered off. The filtrate was washed with dilute sodium bicarbonate, dried over sodium sulfate, and concentrated to dryness in vacuo. The residue which crystallized on standing, was recrystallized from a mixture of benzene and hexane to give (2-benzoyl-4-trifluoromethylphenylcarbamoylmethyl) carbamic acid benzyl ester which upon two further crystallizations from benzene-hexane melted at 128.5–130°.

The 2-amino-5-trifluoromethylbenzophenone used above as a starting material is not a part of this invention but its preparation is hereinbelow set forth in order that the present disclosure may be complete.

80 g. of sodium nitrite were added slowly with stirring to 460 ml. of concentrated sulfuric acid. After heating to 70°, a clear solution was obtained. This solution was cooled and 200 g. of 2-chloro-5-trifluoromethylaniline were slowly added at a temperature between 10 and 20°. The reaction mixture was stirred for one hour at 20° and then poured onto a mixture of 200 g. of sodium chloride and 1.6 kg. of ice. Excess sodium chloride was filtered off. A solution of 280 g. of zinc chloride in 300 ml. of water was added to the filtrate whereupon a zinc chloride double salt of the corresponding diazonium compound precipitated. After standing overnight at 0°, the double salt was filtered off and washed with a cold saturated salt solution.

To a solution of 120 g. of sodium cyanide and 72 g. of cuprous cyanide in 300 ml. of water were added with stirring and cooling with ice, 291 g. of the wet zinc chloride double salt. After the addition of 24 g. of sodium carbonate, the mixture was first stirred for one hour at 20° and then at 70° for an additional ½ hour. The reaction mixture was cooled and extracted with ether to obtain crude 2-chloro-5-trifluoromethylbenzonitrile. The product was purified by steam distillation and crystallization of the organic part of the distillate from hexane to give the pure compound, M.P. 39–40°.

To a solution of phenyl magnesium bromide, prepared from 9.5 g. of magnesium, 58.5 g. of bromobenzene and 500 ml. of anhydrous ether, was added with stirring a solution of 39 g. of 2-chloro-5-trifluoromethylbenzonitrile in 200 ml. of benzene. 400 ml. of solvent were distilled off and the reaction mixture was then refluxed for 16 hours. The Grignard complex was decomposed with 40 g. of ammonium chloride and 200 g. of ice. The mixture was then extracted with benzene. 2-chloro-5-trifluoromethylbenzophenone imine hydrochloride was precipitated from the benzene solution by the addition of 40 ml. of concentrated hydrochloric acid. The product was filtered off, washed with benzene and dried in vacuo, M.P. 248–251°, and upon further purification melted at 250–262°.

60 g. of 2-chloro-5-trifluoromethylbenzophenone imine hydrochloride were refluxed overnight with a mixture of 300 ml. of toluene and 300 ml. of 25% sulfuric acid while stirring. The toluene layer was separated, washed with water, dried, concentrated in vacuo and the residue crystallized from hexane to yield pure 2-chloro-5-trifluoromethylbenzophenone, M.P. 39–40° (corr.).

50 g. of 2-chloro-5-trifluoromethylbenzophenone and 500 ml. of concentrated aqueous ammonia were reacted in a closed vessel for 10 hours at 140° in the presence of 10 g. of cuprous chloride catalyst. The reaction product was extracted with ether. The ether extract was concentrated in vacuo, the residue dissolved in hexane and purified by chromatography using a 10 fold amount of neutral alumina (Brockmann activity state II). Elution with a hexane-ether mixture (1:1) and evaporation of the solvent gave 2-amino-5-trifluoromethylbenzophenone which was recrystallized from hexane to give yellow crystals, M.P. 81–82° (corr.).

*Example 12*

A solution of 2.25 g. of (2-benzoyl-4-trifluoromethylphenylcarbamoylmethyl) carbamic acid benzyl ester in 15 cc. of 20% hydrobromic acid in acetic acid was stirred for 25 minutes at room temperature. The resultant 2-glycylamino-5-trifluoromethylbenzophenone was not isolated, but 200 cc. of anhydrous ether was added to the reaction mixture. Water was then added and the mixture cooled in an ice bath and made slightly alkaline with ammonia. The organic layer was separated, washed with water, dried over sodium sulfate, and the solution concentrated to dryness in vacuo. The residue was heated to reflux for 3 hours in 30 cc. of pyridine. Following removal of the solvent in vacuo, the residue was crystallized from hexane yielding 7-trifluoromethyl-5-phenyl-3H-1,4 - benzodiazepin - 2(1H)-one.

*Example 13*

To a solution of 5.7 g. of crude 2-amino-5-methoxybenzophenone and 5.2 g. of carbobenzoxyglycine in 250 cc. of methylene chloride cooled to 0°, 5.2 g. of N,N'-dicyclohexylcarbodiimide was added in four portions at 30 minute intervals. After five hours in an ice bath, the reaction mixture was kept at room temperature for 2 days. Following the addition of 4 cc. of acetic acid, the reaction was stirred for 30 minutes and dicyclohexylurea was filtered off. The filtrate was washed with dilute sodium carbonate and dried over sodium sulfate. After filtration and concentration to dryness in vacuo, the residue was crystallized from benzene-hexane to give (2-benzoyl-4-methoxyphenylcarbamoylmethyl) carbamic acid benzyl ester. Recrystallization from a mixture of ethyl acetate and hexane gave colorless needles melting at 130–132°.

The 2-amino-5-methoxybenzophenone used above as a starting material is not a part of this invention but its preparation is herein below set forth in order that the present disclosure may be complete.

A Grignard reagent prepared from 24 g. of bromobenzene and 3.6 g. of magnesium in 200 cc. of ether was added slowly during 1¼ hrs. to a solution of 27.1 g. of 2-methyl-6-methoxy-3,1-benzoxazin-4-one dissolved in 375 cc. of dry benzene and 125 cc. of ether at 0–5°. After all the Grignard reagent had been added, the reaction was stirred for ½ hr. at 0–5° and then allowed to come to room temperature. It was then cooled in an ice bath and decomposed with 400 cc. of 2 N HCl. The organic layer was then separated and concentrated to dryness in vacuo. The residue was dissolved in 375 cc. of ethanol and 125 cc. of concentrated hydrochloric acid and refluxed for 2 hrs. After removal of solvent by distillation in vacuo, the residue was stirred with dilute sodium hydroxide and extracted with benzene. The organic layer was then washed with water, dried over sodium sulfate and then concentrated to dryness in vacuo leaving 20.6 g. of a yellow brown oil. The residue was dissolved in 160 cc. of benzene and 370 cc. of hexane and passed through a column of 250 g. of Woelm alumina grade I neutral. Elution with 1:2 and 2:1 benzene-hexane followed by benzene and crystallation from hexane gave 2-amino-5-methoxybenzophenone, M.P. 50–52°.

*Example 14*

A solution of 3.0 g. of (2-benzoyl-4-methoxy-phenylcarbamoylmethyl) carbamic acid benzyl ester in 30 cc. of 20% hydrobromic acid in acetic acid was stirred for 30 minutes at room temperature. On slow addition of 175 cc. of anhydrous ether, a gummy precipitate formed. The supernatant liquid was poured off and the residue was partitioned between water and ether. The resultant 2-glycylamino-5-methoxybenzophenone was not isolated but, after cooling in ice, the mixture was neutralized with ammonia. The ether layer was then separated, dried over sodium sulfate, and concentrated to dryness in vacuo. The residue crystallized on standing. Recrystallization from benzene-hexane gave 7-methoxy-5-phenyl-3H-1,4-benzodiazepin-2 (1H)-one.

*Example 15*

A solution of 3.1 g. of (2-benzoyl-4-chlorophenyl-carbamoylmethyl) carbamic acid benzyl ester in 30 cc. of 20% hydrobromic acid in glacial acetic acid was stirred for 45 minutes at room temperature. On addition of 175 cc. of anhydrous ether, a gummy solid precipitated. After several minutes the ether solution was decanted. The resultant 5-chloro-2-glycylaminobenzophenone was not isolated, but about 155 cc. of ether was added to the residue and after chilling in an ice bath, 10% sodium hydroxide was added until the mixture was alkaline. The ether layer was then separated, washed twice with water and dried over sodium sulfate. After filtration, the ether solution was concentrated to dryness in vacuo. The residue was crystallized from benzene to yield 7-chloro-5-phenyl-3H-1,4-benzodiazepin-2(1H)-one.

I claim:
1. A compound of the formula

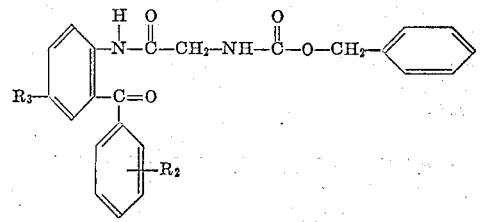

wherein $R_2$ and $R_3$ are selected from the group consisting of hydrogen, halogen, lower alkoxy, trifluoromethyl, and nitro.

2. (2 - benzoyl - 4 - chlorophenylcarbamoylmenthyl) carbamic acid benzyl ester.

3. 2 - (2 - chlorobenzoyl - 4 - chlorophenylcarbamoylmethyl) carbamic acid benzyl ester.

4. (2 - benzoylphenylcarbamoylmethyl) carbamic acid benzyl ester.

5. (2 - benzoyl - 4 - trifluoromethylphenylcarbamoylmethyl) carbamic acid benzyl ester.

References Cited by the Examiner

UNITED STATES PATENTS 2,852,553   9/58   D'Amico et al. _____ 260—471
2,895,927   7/59   Bevilacqua et al. _____ 260—471
2,999,091   9/60   Zaugg _____ 260—239.3

OTHER REFERENCES

Ben-Ishai et al.: Jour. Org. Chem., vol. 17, pp. 1564–1570 (1954).

Greenstein et al.: Chemistry of the Amino Acids, vol. II, pp. 965–978, 887–901 and 1016–1024 (1961).

Khorana: Chem. & Ind., pp. 1087–8 (1955).

Sheehan et al.: J. Am. Chem. Soc., 77, pp. 1067–9 (1955).

LORRAINE A. WEINBERGER, *Primary Examiner.*

IRVING MARCUS, HAROLD G. MOORE, LEON ZITVER, *Examiners.*